United States Patent
Prochaska et al.

(10) Patent No.: US 9,523,537 B2
(45) Date of Patent: Dec. 20, 2016

(54) DESICCANT BASED CHILLING SYSTEM

(71) Applicant: General Electric Company, Schenectady, NY (US)

(72) Inventors: James K. Prochaska, Spring, TX (US); Narendra Digamber Joshi, Schenectady, NY (US); Balachandar Naidu, Sugar Land, TX (US); Daniel Kaftori, Haita (IL)

(73) Assignee: General Electric Company, Schenectady, NY (US)

( * ) Notice: Subject to any disclaimer, the term of this patent is extended or adjusted under 35 U.S.C. 154(b) by 756 days.

(21) Appl. No.: 13/794,205

(22) Filed: Mar. 11, 2013

(65) Prior Publication Data

US 2014/0250935 A1    Sep. 11, 2014

(51) Int. Cl.

| | | |
|---|---|---|
| *F25D 23/00* | (2006.01) | |
| *F25D 17/06* | (2006.01) | |
| *F25B 27/00* | (2006.01) | |
| *F25B 17/00* | (2006.01) | |
| *F28C 3/08* | (2006.01) | |
| *F28B 9/06* | (2006.01) | |
| *F28C 1/14* | (2006.01) | |
| *F02C 7/143* | (2006.01) | |
| *F28F 25/00* | (2006.01) | |
| *F28B 1/06* | (2006.01) | |

(52) U.S. Cl.
CPC ............... *F28C 3/08* (2013.01); *F02C 7/143* (2013.01); *F02C 7/1435* (2013.01); *F28B 1/06* (2013.01); *F28B 9/06* (2013.01); *F28C 1/14* (2013.01); *F28F 25/00* (2013.01); *Y02T 50/675* (2013.01)

(58) Field of Classification Search
CPC .............. F28C 3/08; F28C 1/14; F28B 1/06; F28B 9/06; F02C 7/141; F02C 7/143; F02C 7/1435; F02C 3/04; F28F 25/00
USPC ...... 62/271, 94, 238.3, 481, 482, 259.4, 121
See application file for complete search history.

(56) References Cited

U.S. PATENT DOCUMENTS

| | | | | |
|---|---|---|---|---|
| 4,955,205 | A * | 9/1990 | Wilkinson | ........................ 62/94 |
| 5,758,485 | A * | 6/1998 | Frutschi | ........................ 60/772 |
| 2003/0010049 | A1* | 1/2003 | Inoue et al. | ................. 62/238.3 |
| 2004/0000152 | A1* | 1/2004 | Fischer | ........................... 62/94 |
| 2004/0261440 | A1* | 12/2004 | Forkosh et al. | ................ 62/271 |
| 2008/0083226 | A1* | 4/2008 | Joshi et al. | ..................... 60/772 |
| 2010/0263375 | A1* | 10/2010 | Grieve | ........................... 60/612 |
| 2012/0180512 | A1* | 7/2012 | Laing et al. | ................. 62/238.6 |

* cited by examiner

*Primary Examiner* — Ryan J Walters
*Assistant Examiner* — Joseph Trpisovsky
(74) *Attorney, Agent, or Firm* — Fletcher Yoder, P.C.

(57) ABSTRACT

A system includes an intercooler configured to receive an airflow from a first compressor, to transfer heat from the airflow to a working fluid, and to provide the airflow to a second compressor. The system also includes an evaporative chiller configured to receive the working fluid from the intercooler, to chill the working fluid via evaporative cooling within an ambient air environment, and to provide the working fluid to the intercooler. In addition, the system includes a desiccant system configured to reduce a humidity of ambient air within the evaporative chiller.

18 Claims, 6 Drawing Sheets

DESICCANT BASED CHILLING SYSTEM

BACKGROUND OF THE INVENTION

The disclosed subject matter relates to a desiccant based chilling system.

Certain power generation systems include a gas turbine engine configured to combust a mixture of fuel and compressed air to produce hot combustion gas. Certain gas turbine engines include an intercooler configured to transfer heat from a gas flow to a working fluid, thereby reducing a temperature of the gas flow and generating a hot working fluid. The hot working fluid from the intercooler may be cooled within an evaporative chiller, and returned to the intercooler. Certain evaporative chillers are configured to cool the working fluid via evaporative cooling within an ambient air environment. Unfortunately, humidity within the ambient air reduces the effectiveness of the evaporative chiller. Accordingly, the cooling capacity of the intercooler may be reduced while the gas turbine engine is operating within a high humidity environment.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes an intercooler configured to receive an airflow from a first compressor, to transfer heat from the airflow to a working fluid, and to provide the airflow to a second compressor. The system also includes an evaporative chiller configured to receive the working fluid from the intercooler, to chill the working fluid via evaporative cooling within an ambient air environment, and to provide the working fluid to the intercooler. In addition, the system includes a desiccant system configured to reduce a humidity of ambient air within the evaporative chiller.

In another embodiment, a system includes an evaporative chiller configured to receive an ambient airflow through a periphery of the evaporative chiller and to chill a working fluid via evaporative cooling within the ambient airflow. The system also includes a desiccant system at least partially disposed about the periphery of the evaporative chiller. The desiccant system is configured to reduce a humidity of the ambient airflow as the ambient airflow flows through the desiccant system into the evaporative chiller.

In a further embodiment, a system includes an intercooler configured to receive a first airflow from a compressor and to transfer heat from the first airflow to a working fluid. The system also includes an evaporative chiller configured to receive the working fluid from the intercooler, to receive a second airflow from an ambient air environment, and to chill the working fluid via evaporative cooling within the second airflow. In addition, the system includes a desiccant system having a desiccant flow assembly and a regenerator. The desiccant flow assembly is configured to flow a liquid desiccant through the second airflow to reduce a humidity of the second airflow, and the regenerator is configured to receive at least a portion of the liquid desiccant from the desiccant flow assembly and to reduce a moisture content of the liquid desiccant within the regenerator using the heat from the first airflow.

In another embodiment, a system includes an evaporative chiller configured to receive an ambient airflow, to chill the ambient airflow via evaporative cooling to establish a chilled airflow, and to provide the chilled airflow to a compressor. The system also includes a desiccant system having a desiccant flow assembly and a regenerator. The desiccant flow assembly is configured to flow a liquid desiccant through the ambient airflow to reduce a humidity of the ambient airflow, and the regenerator is configured to receive at least a portion of the liquid desiccant from the desiccant flow assembly and to reduce a moisture content of the liquid desiccant within the regenerator using heat from a discharge airflow from the compressor.

In a further embodiment, a system includes a condenser configured to receive steam from a steam turbine, to condense the steam into water by transferring heat from the steam to a working fluid, and to provide the water to a heat recovery steam generator. The system also includes an evaporative chiller configured to receive the working fluid from the condenser, to chill the working fluid via evaporative cooling within an ambient air environment, and to provide the working fluid to the condenser. In addition, the system includes a desiccant system configured to reduce a humidity of ambient air within the evaporative chiller.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain gas turbine engines include a low pressure compressor, a high pressure compressor, and an intercooler configured to cool an airflow between the low pressure compressor and the high pressure compressor. Cooling the airflow increases the density of the air, thereby providing a combustor with increased oxygen for combustion. Within the intercooler, heat from the airflow is transferred to a working fluid. The working fluid, in turn, may be chilled by an evaporative chiller, such as a cooling tower. Within the evaporative chiller, the working fluid is chilled via evaporative cooling within an ambient air environment. Unfortunately, humidity within the ambient air reduces the effectiveness of the evaporative chiller. As a result, the cooling capacity of the intercooler may be reduced while the gas turbine engine is operating within a high humidity environment.

Certain embodiments of the present disclosure may increase the efficiency of an evaporative chiller by reducing humidity of ambient air within the evaporative chiller. For example, certain embodiments include a gas turbine system having an intercooler configured to receive an airflow from a first compressor (e.g., a low pressure compressor), to transfer heat from the airflow to a working fluid, and to provide the working fluid to a second compressor (e.g., a high pressure compressor). The gas turbine system also includes an evaporative chiller configured to receive the working fluid from the intercooler, to chill the working fluid via evaporative cooling within an ambient air environment, and to provide the working fluid to the intercooler. In addition, the gas turbine system includes a desiccant system configured to reduce a humidity of the ambient air within the evaporative chiller. The reduced humidity enables the evaporative cooling process to absorb more heat from the working fluid, thereby enhancing the effectiveness of the intercooler. Consequently, the temperature of the airflow into the second compressor may be reduced, thereby increasing the power output of the gas turbine system.

In certain embodiments, the evaporative chiller is configured to receive a flow of ambient air through a periphery of the evaporative chiller, and the desiccant system is at least partially disposed about the periphery of the evaporative chiller. In further embodiments, the desiccant system includes a desiccant flow assembly and a regenerator. The desiccant flow assembly is configured to flow a liquid desiccant through the ambient airflow into the evaporative chiller, and the regenerator is configured to receive at least a portion of the liquid desiccant from the desiccant flow assembly and to reduce a moisture content of the liquid desiccant within the regenerator. In certain embodiments, the regenerator is configured to reduce the moisture content of the liquid desiccant using the heat from the airflow from the first compressor.

Figure 1:
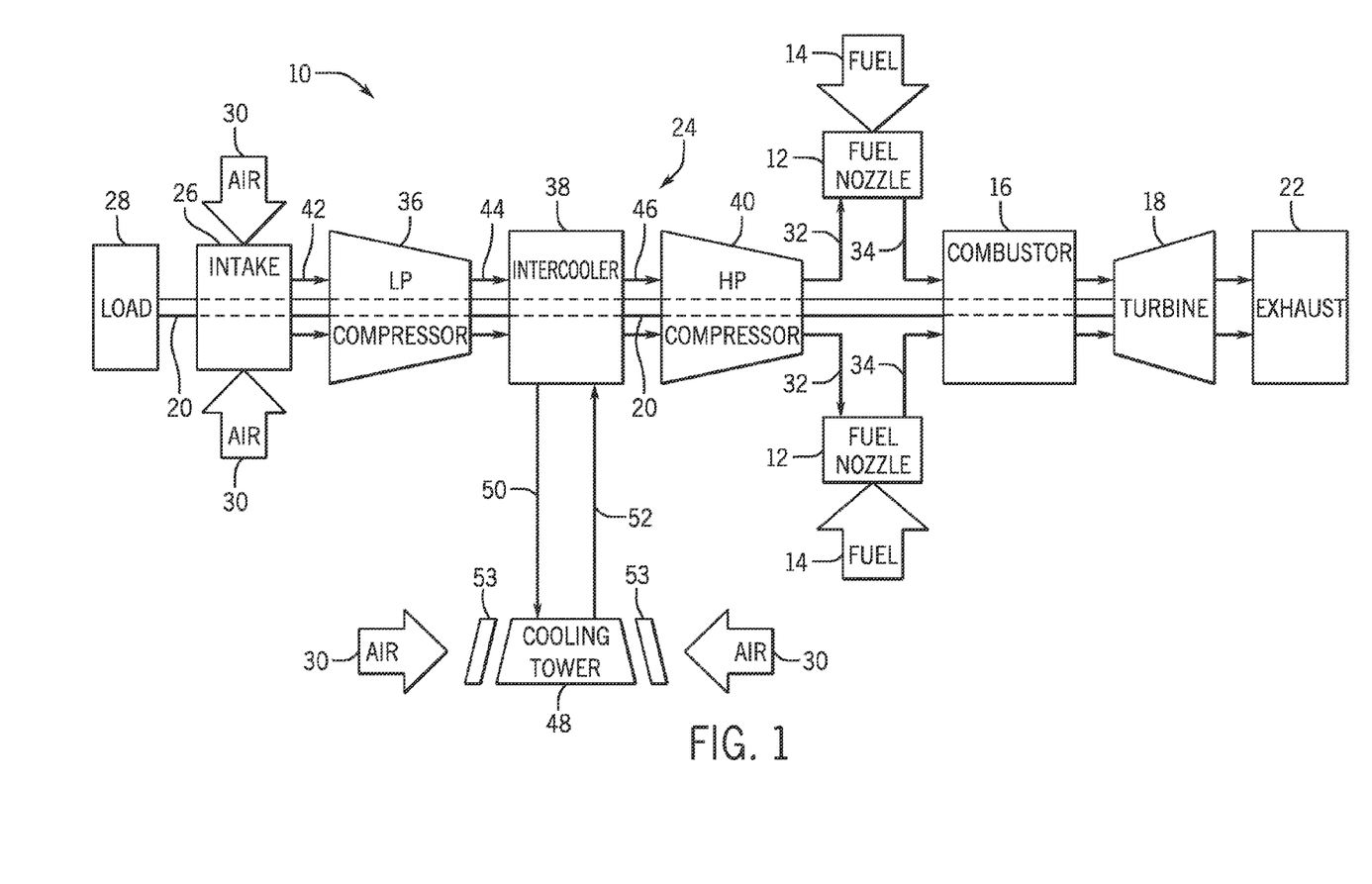
FIG. 1 is a block diagram of an exemplary turbine system including an embodiment of a desiccant system configured to reduce a humidity of ambient air within an evaporative chiller.

Turning now to the drawings, FIG. 1 is a block diagram of a turbine system 10 (e.g., gas turbine engine) including an embodiment of a desiccant system configured to reduce a humidity of ambient air within an evaporative chiller. The turbine system 10 includes a fuel nozzle or fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized combustion gas into a turbine 18. As will be appreciated, the turbine 18 includes one or more stators having fixed vanes or blades, and one or more rotors having blades that rotate relative to the stators. The combustion gas passes through the turbine rotor blades, thereby driving the turbine rotor to rotate. Coupling between the turbine rotor and a shaft 20 induces the shaft 20 to rotate, thereby driving several components throughout the gas turbine system 10, as illustrated. Eventually, the combustion gas exits the gas turbine system 10 via an exhaust outlet 22.

A compressor system 24 includes a compressor having blades rigidly mounted to a rotor which is driven to rotate by the shaft 20. As air passes through the rotating blades, air pressure increases, thereby providing the combustor 16 with sufficient air for proper combustion. The compressor system 24 may intake air to the gas turbine system 10 via an air intake 26. Further, the shaft 20 may be coupled to a load 28, which may be powered via rotation of the shaft 20. As will be appreciated, the load 28 may be any suitable device that may use the power of the rotational output of the gas turbine system 10, such as a power generation plant or an external mechanical load. For example, the load 28 may include an electrical generator, a propeller of an airplane, and so forth. The air intake 26 draws air 30 into the gas turbine system 10 via a suitable mechanism, such as a cold air intake. The air 30 then flows through blades of the compressor, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

In the illustrated embodiment, the compressor system 24 includes a low pressure (LP) compressor 36, an intercooler 38, and a high pressure (HP) compressor 40. The LP compressor 36 receives a first airflow 42 from the intake 26 at approximately atmospheric pressure, compresses the first airflow, and outputs a second airflow 44 at an intermediate pressure. As will be appreciated, compressing the airflow increases the temperature of the compressed air. Accordingly, the temperature of the second airflow 44 is higher than the temperature of the first airflow 42. To reduce the temperature of the compressed air, the intercooler 38 transfers heat from the second airflow 44 to a working fluid, thereby generating a third airflow 46 having a pressure substantially equal to the second airflow 44 and a temperature significantly less than the second airflow 44. By way of example, the temperature of the second airflow 44 may be about 75 to about 150 degrees Celsius, and the temperature of the third airflow 46 may be about 25 to about 55 degrees Celsius. The third airflow 46 is compressed within the HP compressor 40, thereby providing high pressure air to the fuel injector 12. As will be appreciated, cooling the airflow between the LP compressor 36 and the HP compressor 40 increases the density of the air, thereby providing the combustor 16 with more oxygen for combustion.

Transferring heat from the second airflow 44 to the working fluid increases the temperature of the working fluid. Accordingly, an evaporative chiller, such as the illustrated cooling tower 48, is employed to reduce the temperature of the working fluid. As illustrated, hot working fluid 50 (e.g., water, ethylene glycol, etc.) flows from the intercooler 38 to the cooling tower 48. The working fluid is then chilled within the cooling tower 48 via evaporative cooling within an ambient air environment. The chilled working fluid 52 flows from the cooling tower 48 back to the intercooler 38 to receive additional heat from the second airflow 44.

As will be appreciated, humidity within the ambient air reduces the effectiveness of an evaporative chiller, such as the cooling tower 48. Accordingly, the turbine system 10 includes a desiccant system 53 to reduce the humidity of the ambient air within the cooling tower 48. The reduced humidity enables the evaporative cooling process to absorb more heat from the working fluid, thereby enhancing the cooling capacity of the intercooler 38. Consequently, the temperature of the third airflow 46 may be reduced, thereby increasing the power output of the turbine system. For example, the power output may increase by about 10 percent to about 15 percent while the turbine system is operating within a high humidity environment. In addition, the enhanced cooling capacity provided by the desiccant system 53 may facilitate the use of a smaller intercooler, and/or fewer and/or smaller cooling towers. As a result, the costs associated with manufacturing a gas turbine system may be reduced.

Figure 2:
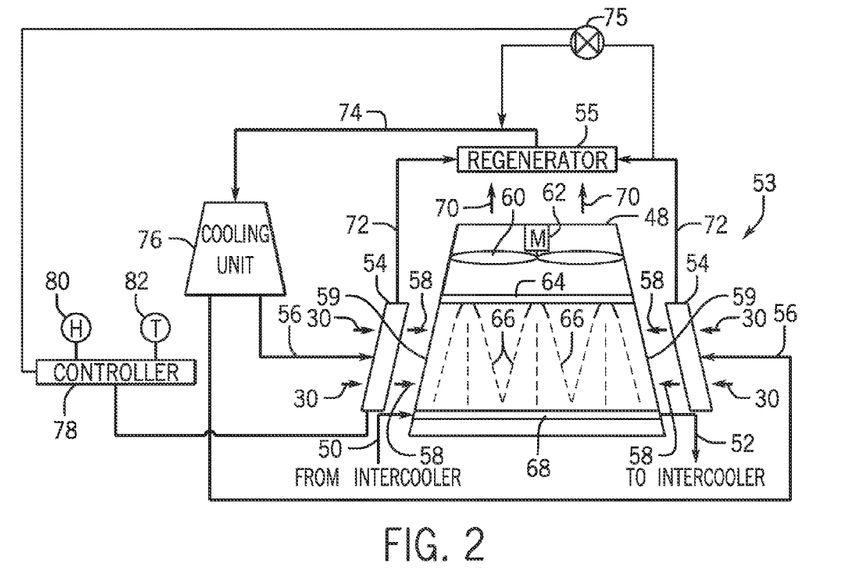
FIG. 2 is a schematic diagram of an embodiment of a desiccant system that may be employed within the turbine system of FIG. 1.

FIG. 2 is a schematic diagram of an embodiment of a desiccant system 53 that may be employed within the turbine system 10 of FIG. 1. In the illustrated embodiment, the desiccant system 53 includes a desiccant flow assembly 54 and a regenerator 55. The desiccant flow assembly 54 is configured to flow a liquid desiccant 56 (e.g., LiBr, LiCl, $CaCl_2$, etc.) through an airflow into the cooling tower 48 to reduce a humidity of the airflow. For example, the desiccant flow assembly 54 may include a porous material configured to facilitate mixing of the liquid desiccant 56 and a flow of ambient air. In such a configuration, the ambient air 30 flows through the desiccant flow assembly 54, the liquid desiccant absorbs moisture from the ambient air, and dehumidified air 58 flows from the desiccant flow assembly 54 into the cooling tower 48. As discussed in detail below, the dehumidified air 58 enhances the efficiency of the cooling tower 48, thereby increasing the cooling capacity of the intercooler 38.

In the illustrated embodiment, the cooling tower 48 is configured to receive the ambient airflow through a periphery of the cooling tower 48 (e.g., through an ambient air inlet 59). For example, if an outer surface of the cooling tower 48 is substantially circular, the cooling tower 48 may receive the ambient airflow through an ambient air inlet 59 extending along the circumference of the circular outer surface. In the illustrated embodiment, the desiccant flow assembly 54 is at least partially disposed about the periphery of the cooling tower 48. For example, the desiccant flow assembly 54 may extend about more than 25 percent, more than 50 percent, more than 75 percent, or approximately 100 percent of the periphery of the cooling tower 48. In addition, the desiccant flow assembly 54 may extend vertically along more than 25 percent, more than 50 percent, more than 75 percent, or approximately 100 percent of the vertical extent of the ambient air inlet 59. Disposing the desiccant flow assembly 54 about a substantial portion of the ambient air inlet 59 enables the desiccant system 53 to absorb a substantial portion of the humidity from the ambient air 30. For example, the desiccant system 53 may absorb more than 25 percent, more than 50 percent, more than 60 percent, more than 70 percent, more than 80 percent, more than 90 percent, or more, of the humidity within the ambient airflow into the cooling tower 48.

In the illustrated embodiment, the cooling tower 48 includes a fan 60 and a drive unit 62 (e.g., an electric motor, a hydraulic motor, a pneumatic motor, etc.) configured to drive the fan 60 to rotate. Rotation of the fan 60 draws the ambient air 30 through the desiccant flow assembly 54 and into the cooling tower 48 via the ambient air inlet 59. As a result, an ambient air environment is established within the cooling tower 48. While a single fan 60 and a single drive unit 62 are employed in the illustrated embodiment, it should be appreciated that alternative embodiments may include additional fans 60 (e.g., 1, 2, 3, 4, 5, or more) and/or additional drive units 62 (e.g., one drive unit per fan 60).

In the illustrated embodiment, the cooling tower 48 also includes a fluid injection system 64 configured to spray a cooling fluid 66 (e.g., water) onto a heat exchanger 68. The heat exchanger 68 is configured to receive the hot working fluid 50 from the intercooler 38, and to flow the working fluid through the cooling tower 48. In certain embodiments, the heat exchanger 68 includes a network of interconnected tubes and cooling fins coupled to the tubes. As the cooling fluid 66 from the fluid injection system 64 contacts the heat changer 68, heat from the hot working fluid 50 is transferred to the cooling fluid 66, thereby inducing the cooling fluid 66 to vaporize. The heating and vaporization of the cooling fluid 66 within the ambient air environment reduces the temperature of the working fluid. Accordingly, chilled working fluid 52 flows back to the intercooler 38, thereby facilitating additional cooling of hot compressor discharge air. In addition, the heated and vaporized cooling fluid is conveyed out of the cooling tower 48 by the ambient airflow, thereby establishing a hot exhaust airflow 70.

In the illustrated embodiment, the regenerator 55 is positioned to receive the hot exhaust airflow 70 from the cooling tower 48. For example, if the cooling tower 48 is configured to expel the exhaust airflow 70 from a top portion of the cooling tower 48, the regenerator 55 may be positioned above the top portion. Accordingly, the exhaust airflow 70 from the cooling tower 48 heats the liquid desiccant within the regenerator 55, thereby reducing the moisture content of the liquid desiccant. As illustrated, the regenerator 55 receives moisture-carrying liquid desiccant 72 from the desiccant flow assembly 54. Heating the liquid desiccant 72 within the regenerator 55 releases the moisture (e.g., in the form of water vapor), thereby establishing a flow of hot, dry liquid desiccant 74. The released moisture may be expelled into the atmosphere and/or condensed for use in other devices (e.g., within the gas turbine system, within a power generation system, etc.). The hot, dry liquid desiccant 74 flows through a cooling unit 76, such as a cooling tower, which reduces the temperature of the liquid desiccant. As a result, a cool, dry liquid desiccant 56 suitable for absorbing additional moisture is generated. The cool, dry liquid desiccant 56 flows back to the desiccant flow assembly 54 to reduce humidity within the ambient airflow into the cooling tower 48.

In the illustrated embodiment, the desiccant system 53 includes a bypass valve 75 configured to selectively direct a portion of the moisture-carrying liquid desiccant 72 into the flow of hot, dry liquid desiccant 74, thereby bypassing the regenerator 55. For example, the bypass valve 75 may be transitioned to a closed position in which substantially all of the liquid desiccant 72 flows into the regenerator 55, the bypass valve 75 may be transitioned to a fully open position in which substantially all of the liquid desiccant 72 bypasses the regenerator 55, and the bypass valve 75 may be transitioned to a partially open position in which a portion of the liquid desiccant flows through the regenerator 55. As discussed in detail below, the position of the bypass valve 75 may be selected based on ambient air conditions and/or operation of the gas turbine system.

Because the regenerator 55 is positioned to receive the hot exhaust airflow 70 from the cooling tower 48, an additional heating unit (e.g., electric heater, liquid/gas fuel burner, etc.), which may be employed in certain embodiments to regenerate liquid desiccant, is obviated. As a result, the costs associated with manufacturing and operating the desiccant system may be reduced. As previously discussed, heat from the LP compressor discharge air 44 is transferred to the working fluid 50 via the intercooler 38, and heat from the working fluid 50 is transferred to the cooling fluid 66 and to the exhaust airflow 70. Accordingly, in the illustrated embodiment, the liquid desiccant within the regenerator 55 indirectly receives heat from the LP compressor discharge air 44. In alternative embodiments, the liquid desiccant within the regenerator 55 may be directly heated by the LP compressor discharge air 44, and/or the liquid desiccant may be heated by the working fluid 50.

In the illustrated embodiment, the desiccant system 53 includes a controller 78 (e.g., including a processor and a memory) configured to selectively activate the desiccant system 53 based on a temperature and/or a humidity of the ambient air 30. As illustrated, a humidity sensor 80 and a temperature sensor 82 are communicatively coupled to the controller 78. In certain embodiments, the sensors 80 and 82 are positioned along a flow path of the ambient airflow into the cooling tower 48, thereby enabling the controller 78 to detect the temperature and/or the humidity of the ambient air. If the temperature and/or the humidity of the ambient air exceeds a respective threshold value, the controller 78 may activate the desiccant system 53, thereby reducing the humidity of the airflow into the cooling tower 48 and increasing the cooling capacity of the intercooler 38. By way of example, if the relative humidity of the ambient air exceeds 10 percent, 20 percent, 30 percent, 40 percent, or more, the controller 78 may activate the desiccant system 53. In addition, if the temperature of the ambient air exceeds 15 degrees Celsius, 20 degrees Celsius, 25 degrees Celsius, or more, the controller 78 may activate the desiccant system 53. In addition, the controller 78 may be configured to activate the desiccant system based on a combination of the measured temperature and the measured humidity. If the temperature and/or the humidity drop below the respective threshold value, the controller 78 may deactivate the desiccant system.

As illustrated, the controller 78 is communicatively coupled to the bypass valve 75. In the illustrated embodiment, the controller 78 is configured to control the position of the bypass valve 75, thereby adjusting desiccant flow through the regenerator 55. For example, if the temperature and/or the humidity of the ambient air exceeds a respective threshold value, the controller 78 may instruct the bypass valve 75 to transition to a closed position, thereby directing substantially all of the liquid desiccant 72 through the regenerator 55. However, if the temperature and/or the humidity of the ambient air drops below the respective threshold value, the controller 78 may instruct the bypass valve 75 to transition to an open or partially open position, thereby enabling at least a portion of the liquid desiccant to bypass the regenerator 55. In certain embodiments, the controller 78 may also control the bypass valve 75 based on operation of the gas turbine system (e.g., based on power output, based on fuel flow, based on internal temperatures of the turbine system, etc.).

Figure 3:
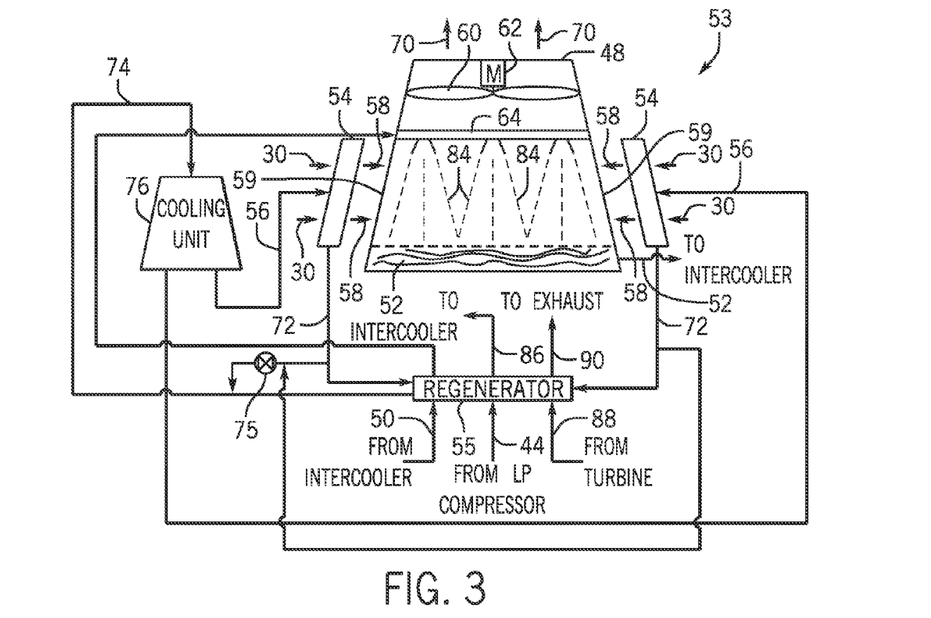
FIG. 3 is a schematic diagram of another embodiment of a desiccant system that may be employed within the turbine system of FIG. 1.

FIG. 3 is a schematic diagram of another embodiment of a desiccant system 53 that may be employed within the turbine system of FIG. 1. Similar to the embodiment described above with referenced to FIG. 2, the desiccant flow assembly 54 is at least partially disposed about the periphery of the cooling tower 48, and the desiccant flow assembly 54 is configured to reduce the humidity of the ambient airflow into the cooling tower 48. As a result, the efficiency of the cooling tower 48 may be increased, thereby enhancing the cooling capacity of the intercooler 38. In the illustrated embodiment, the fluid injection system 64 of the cooling tower 48 is configured to receive the hot working fluid 50 from the intercooler 38 and to inject the hot working fluid into the ambient air within the cooling tower 48. As illustrated, the fluid injection system 64 establishes a spray 84 of the hot working fluid into the cooling tower 48. As a result, heat from the sprayed working fluid 84 is transferred to the ambient airflow through the cooling tower 48. As the sprayed working fluid 84 cools and condenses, it collects within a reservoir of the cooling tower 48, thereby forming a pool of chilled working fluid 52. The chilled working fluid 52 flows back to the intercooler 38 to absorb additional heat from the LP compressor discharge air 44.

In certain embodiments, at least a portion of the hot working fluid 50 flows through the regenerator 55 before flowing to the fluid injection system 64. In such embodiments, heat from the working fluid 50 is transferred to the moisture-carrying liquid desiccant within the regenerator 55, thereby heating the liquid desiccant. As previously discussed, heating the liquid desiccant 72 within the regenerator 55 releases the moisture (e.g., in the form of water vapor), thereby establishing a flow of hot, dry liquid desiccant 74. In addition, because a portion of the heat from the working fluid 50 is transferred to the liquid desiccant, the temperature of the working fluid flow into the cooling tower may be reduced. As a result, a cooling tower having a lower cooling capacity may be employed, thereby reducing the costs associated with manufacturing the gas turbine system.

In further embodiments, at least a portion of the LP compressor discharge air 44 flows through the regenerator 55 before flowing to the intercooler 38. In such embodiments, heat from the LP compressor discharge air 44 is transferred to the moisture-carrying liquid desiccant within the regenerator 55, thereby heating the liquid desiccant. As previously discussed, heating the liquid desiccant 72 within the regenerator 55 releases the moisture (e.g., in the form of water vapor), thereby establishing a flow of hot, dry liquid desiccant 74. In addition, because a portion of the heat from the LP compressor air 44 is transferred to the liquid desiccant, the temperature of the airflow into the intercooler 38 is reduced. As a result, an intercooler and/or a cooling tower having a lower cooling capacity may be employed, thereby reducing the costs associated with manufacturing the gas turbine system.

In certain embodiments, at least a portion of an exhaust flow 88 from the turbine 18 flows into the regenerator 55, and a cooled exhaust flow 90 flows from the regenerator 55 to the exhaust outlet 22. In such embodiments, heat from the exhaust flow 88 is transferred to the moisture-carrying liquid desiccant within the regenerator 55, thereby heating the liquid desiccant. As previously discussed, heating the liquid desiccant 72 within the regenerator 55 releases the moisture (e.g., in the form of water vapor), thereby establishing a flow of hot, dry liquid desiccant 74. The hot, dry liquid desiccant 74 flows through a cooling unit 76, such as a cooling tower, which reduces the temperature of the liquid desiccant. As a result, a cool, dry liquid desiccant 56 suitable for absorbing additional moisture is generated. The cool, dry liquid desiccant 56 flows back to the desiccant flow assembly 54 to reduce humidity within the ambient airflow into the cooling tower 48.

While the illustrated embodiment includes three flows through the regenerator 55 (e.g., the working fluid flow, the LP compressor discharge air flow, and the turbine exhaust flow), it should be appreciated that alternative embodiments may include more or fewer flows (e.g., 1, 2, 3, 4, or more) through the regenerator 55. For example, in certain embodiments, the liquid desiccant within the regenerator may be heated by only the working fluid 50, by only the LP compressor discharge air 44, or by only the turbine exhaust 88. Alternatively, the liquid desiccant within the regenerator may be heated by the hot exhaust air 70 from the cooling tower 48 and at least one of the working fluid 50, the LP compressor discharge air 44, and the turbine exhaust 88. Furthermore, in certain embodiments, the desiccant within the regenerator may be heated by other fluid flows associated with the gas turbine system 10 (e.g., the discharge air 32 from the HP compressor 40) and/or associated with processes and/or machines positioned proximate to the gas turbine system. Because the liquid desiccant within the regenerator 55 is heated by a hot fluid flow associated with operation of the gas turbine system 10 and/or associated with another process/machine positioned proximate to the gas turbine system 10, an additional heating unit (e.g., electric heater, liquid/gas fuel burner, etc.), which may be employed in certain embodiments to regenerate liquid desiccant, is obviated. As a result, the costs associated with manufacturing and operating the desiccant system may be reduced.

Figure 4:
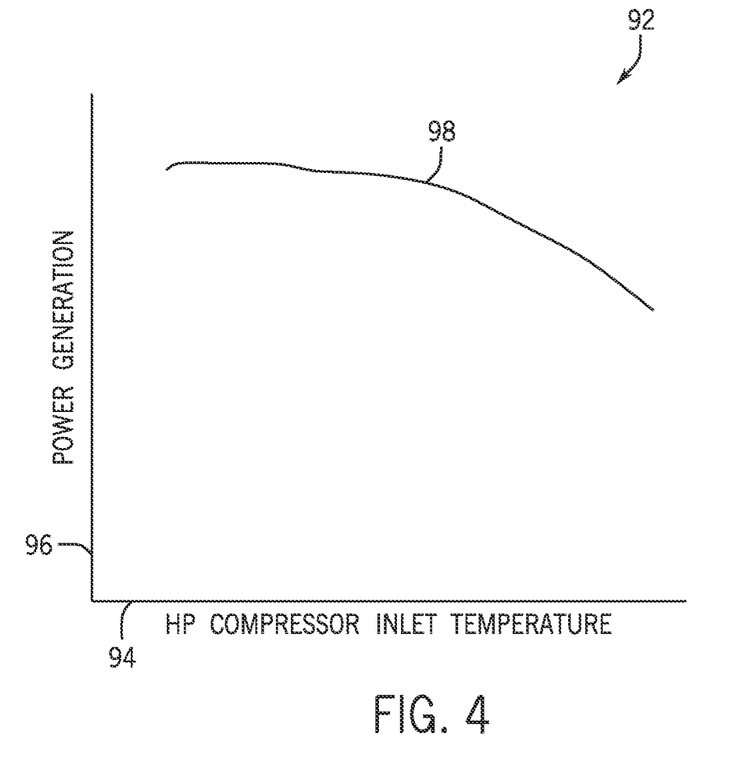
FIG. 4 is an exemplary graph of turbine system power generation.

FIG. 4 is an exemplary graph 92 of turbine system power generation. As illustrated, the graph 92 includes an x-axis 94 representative of a temperature of the airflow 46 into the HP compressor 40, and a y-axis 96 representative of power generated by the gas turbine system 10. The graph 92 also includes a curve 98 representative of turbine system power generation as a function of HP compressor inlet temperature. The curve 98 indicates that power generation decreases as HP compressor inlet temperature increases. Accordingly, enhancing the cooling capacity of the intercooler 38 increases the power output of the turbine system 10. As previously discussed, certain embodiments include a desiccant system configured to reduce humidity of the ambient air within the cooling tower, thereby increasing the efficiency of the cooling tower and enhancing the cooling capacity of the intercooler. Consequently, the desiccant system facilitates increased power output by the turbine system.

While the desiccant system 53 described above is disposed about the periphery of the cooling tower 48, it should be appreciated that the desiccant system may be arranged in other configurations in alternative embodiments. For example, in certain embodiments, the desiccant system 53 may be arranged in-line with the cooling tower 48. In addition, while the cooling tower 48 is configured to chill working fluid from the intercooler 38, it should be appreciated that the cooling tower 48, or other evaporative cooler, may be utilized to chill other fluids within the gas turbine system. Furthermore, while the desiccant system is described above with reference to a cooling tower of a gas turbine system, it should be appreciated that the desiccant system may be utilized to reduce the humidity of an ambient airflow into other evaporative chillers. For example, the desiccant system (e.g., including the desiccant flow assembly and the regenerator) may be employing to enhance the cooling efficiency of evaporative chillers within a hydrocarbon refining facility, within a manufacturing facility, or within a chemical processing facility, among others. In such applications, the evaporative cooling system may be at least partially disposed about a periphery of the evaporative chiller, and/or the regenerator may be positioned to receive a flow of hot exhaust air from the evaporative chiller.

Figure 5:
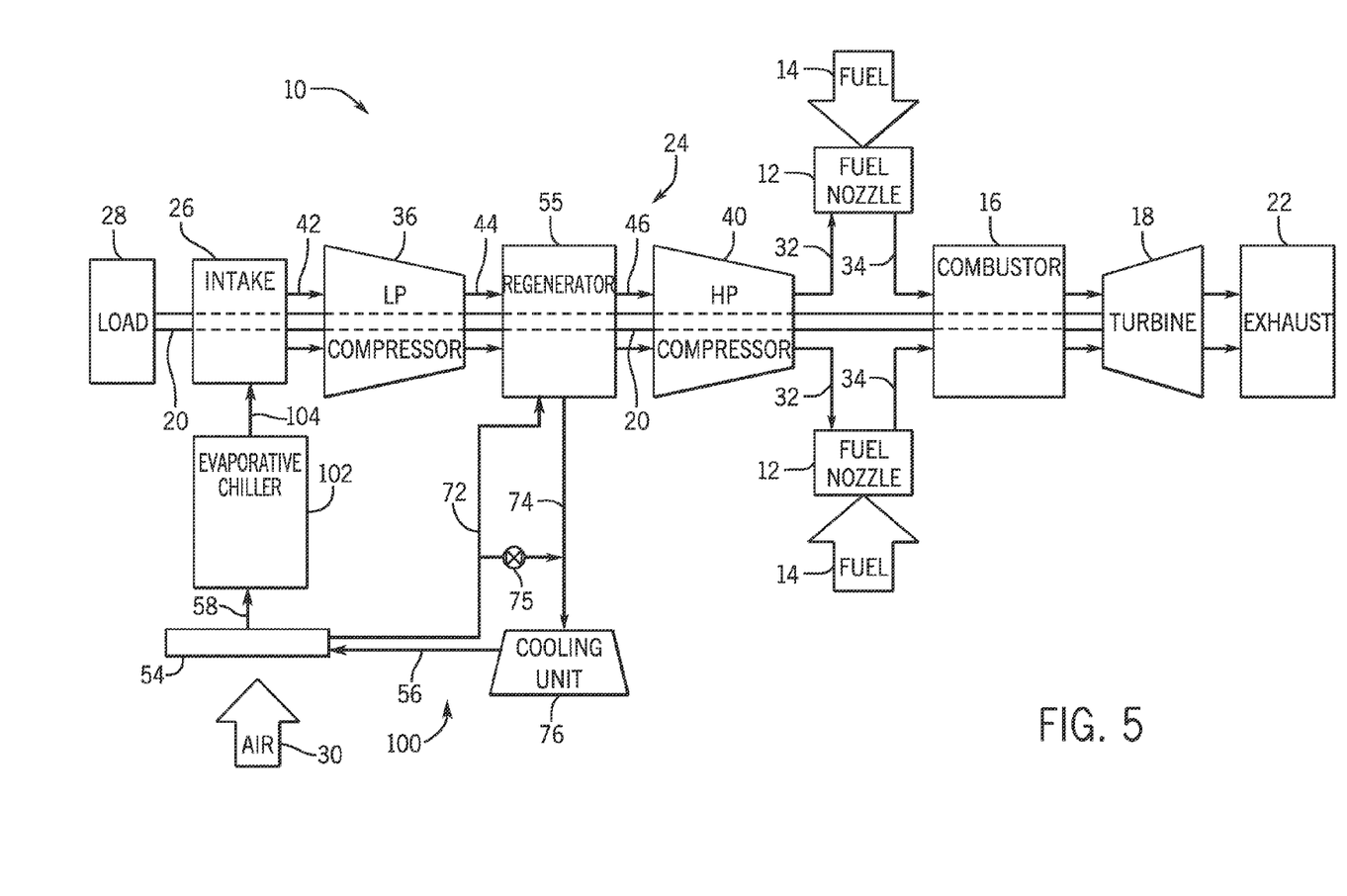
FIG. 5 is a block diagram of an exemplary turbine system including an alternative embodiment of a desiccant system configured to reduce a humidity of ambient air within an evaporative chiller.

FIG. 5 is a block diagram of an exemplary turbine system 10 including an alternative embodiment of a desiccant system 100. In the illustrated embodiment, the turbine system 10 includes an evaporative chiller 102 configured to provide a chilled airflow 104 to the intake 26. Similar to the cooling tower 48 described above, the evaporative chiller 102 is configured to receive an ambient airflow 30, to chill the ambient airflow via evaporative cooling to establish the chilled airflow 104, and to provide the chilled airflow 104 to the compressor system 24 via the intake 26. Chilling the air prior to compression within the compressor system 24 increases the density of the air, thereby providing the combustor 16 with additional oxygen for combustion.

In the illustrated embodiment, the desiccant system 100 is configured to reduce a humidity of the ambient airflow 30 into the evaporative chiller 102, thereby enabling the evaporative cooling process to absorb more heat from the ambient airflow. Consequently, the temperature of the airflow 42 into the compressor system 24 may be reduced, thereby increasing the power output of the gas turbine system. As illustrated, the desiccant system 100 includes a desiccant flow assembly 54 and a regenerator 55. The desiccant flow assembly 54 is configured to flow a liquid desiccant 56 through the ambient airflow 30 to absorb moisture within the ambient airflow 30. Accordingly, the desiccant flow assembly 54 provides dehumidified air 58 to the evaporative chiller 102.

In the illustrated embodiment, the regenerator 55 is positioned to receive hot compressor discharge air 44 from the LP compressor 36. Accordingly, the hot LP compressor discharge air 44 heats the liquid desiccant within the regenerator 55, thereby reducing the moisture content of the liquid desiccant. As illustrated, the regenerator 55 receives moisture-carrying liquid desiccant 72 from the desiccant flow assembly 54. Heating the liquid desiccant 72 within the regenerator 55 releases the moisture (e.g., in the form of water vapor), thereby establishing a flow of hot, dry liquid desiccant 74. The released moisture may be expelled into the atmosphere and/or condensed for use in other devices (e.g., within the gas turbine system, within a power generation system, etc.). The hot, dry liquid desiccant 74 flows through a cooling unit 76, such as a cooling tower, which reduces the temperature of the liquid desiccant. As a result, a cool, dry liquid desiccant 56 suitable for absorbing additional moisture is generated. The cool, dry liquid desiccant 56 flows back to the desiccant flow assembly 54 to reduce humidity within the ambient airflow into the evaporative chiller 102. Similar to the desiccant system 53 described above with reference to FIGS. 2-3, the desiccant system 100 includes a bypass valve 75 configured to selectively direct a portion of the moisture-carrying liquid desiccant 72 into the flow of hot, dry liquid desiccant 74, thereby bypassing the regenerator 55.

Because the regenerator 55 is positioned to receive the hot compressor discharge air 44 from the LP compressor 36, an additional heating unit (e.g., electric heater, liquid/gas fuel burner, etc.), which may be employed in certain embodiments to regenerate liquid desiccant, is obviated. As a result, the costs associated with manufacturing and operating the desiccant system may be reduced. In addition, because heat from the LP compressor air 44 is transferred to the liquid desiccant, the temperature of the airflow 46 into the HP compressor 40 is reduced. As a result, an intercooler, which may be employed in certain embodiments to reduce the HP compressor inlet temperature, is obviated. As a result, the costs associated with manufacturing the gas turbine system may be reduced.

Figure 6:
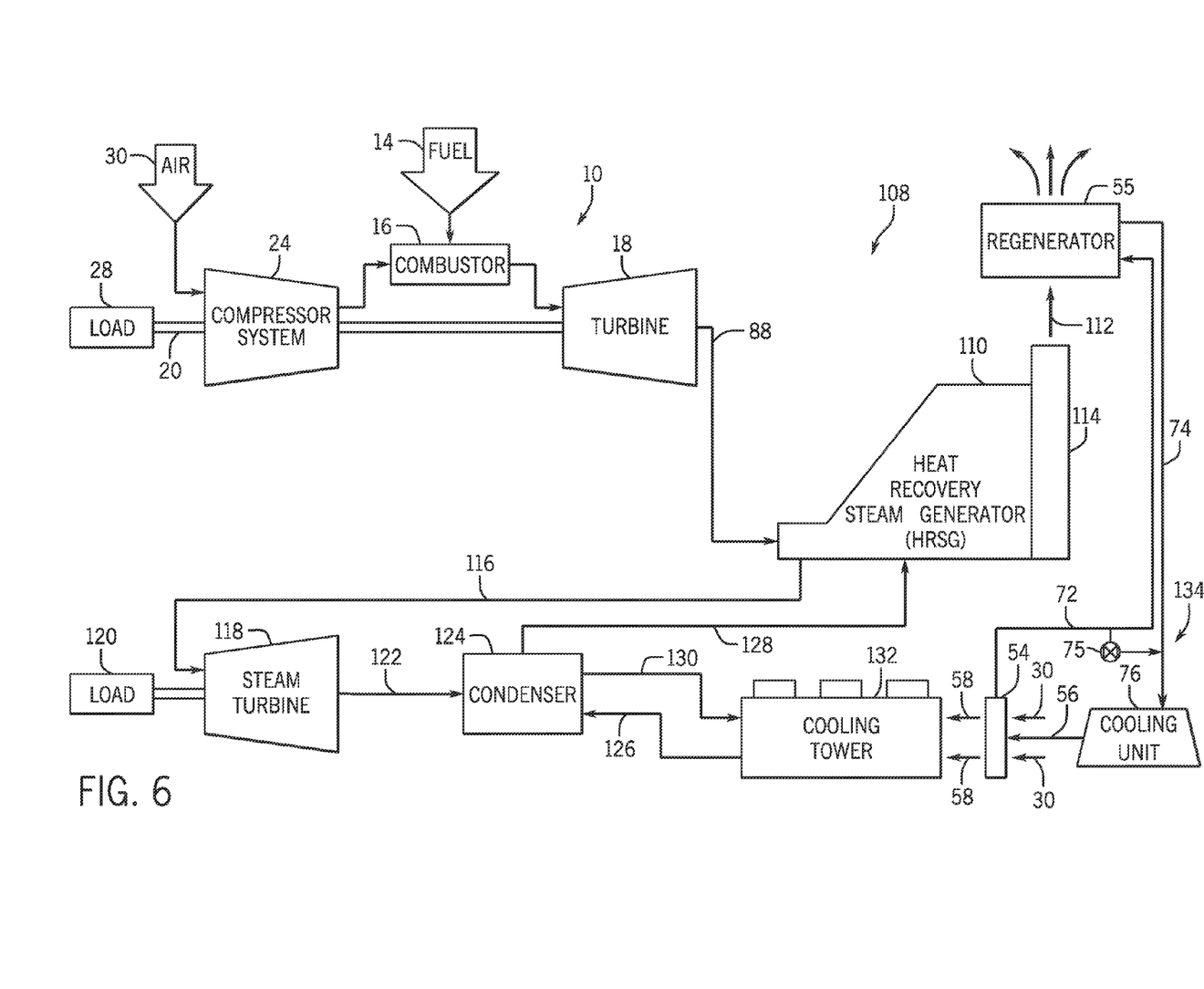
FIG. 6 is a block diagram of an exemplary combined cycle power generation system including an embodiment of a desiccant system configured to reduce a humidity of ambient air within an evaporative chiller.

FIG. 6 is a block diagram of an exemplary combined cycle power generation system 108 including an embodiment of a desiccant system configured to reduce a humidity of ambient air within an evaporative chiller. As illustrated, the system 108 includes a gas turbine engine 10, which may be similar to the gas turbine engine 10 described above with reference to FIG. 1. In the illustrated embodiment, the gas turbine engine 10 includes a combustor 16, a turbine 18, a drive shaft 20, and a compressor system 24. The combustor 16 receives fuel 14, such as natural gas, which may be injected under pressure from fuel nozzles. This fuel is mixed with compressed air and combusted within the combustor 16, thereby generating hot pressurized exhaust gas. The combustor 16 directs the exhaust gas toward an exhaust outlet of the turbine 18. As the exhaust gas from the combustor 16 pass through the turbine 18, blades in the turbine 18 are driven to rotate, thereby rotating the drive shaft 20 along an axis of the gas turbine engine 10. As illustrated, the drive shaft 20 may be connected to various components of the gas turbine engine 10, including the compressor system 24.

The drive shaft 20 connects the turbine 18 to a rotor of a compressor, which includes blades, within the compressor system 24. Thus, rotation of turbine blades in the turbine 18 causes the drive shaft 20 connecting the turbine 18 to the compressor to rotate blades within the compressor. The rotation of blades in the compressor causes the compressor to compress air received via an air intake. The compressed air is then fed to the combustor 16 and mixed with fuel 14 to facilitate combustion. The drive shaft 20 is also connected to a load 28, which may be a stationary load, such as an electrical generator, for producing electrical power in a power plant. Indeed, the load 28 may be any suitable device that is powered by the rotational output of the gas turbine engine 10.

Exhaust gas 88 from the gas turbine engine 10 is directed to a heat recover steam generator (HRSG) 110. The HRSG 110 is a heat exchanger which includes multiple conduits configured to convey a working fluid, such as water, in a direction crosswise (e.g., substantially perpendicular) to the flow of exhaust gas 88 through the HRSG 110. As the exhaust gas 88 flows across the conduits, heat is transferred from the exhaust gas to the water, thereby producing steam. After passing through the HRSG 110, exhaust gas 112 is released to the atmosphere through a stack 114. As illustrated, the generated steam 116 is directed toward a steam turbine 118.

As the high pressure steam 116 passes through the steam turbine 118, blades within the turbine 118 are driven to rotate, thereby driving a second load 120. While the present embodiment includes two loads 28 and 120, it should be appreciated that the gas turbine engine 10 and the steam turbine 118 may be coupled to the same load in alternative embodiments. As the steam passes through the steam turbine 118, the pressure is reduced such that low pressure steam 122 is expelled from the turbine 118. As illustrated, the low pressure steam 122 flows into a condenser 124 which condenses the steam. The condenser 124 is a heat exchanger which includes multiple conduits configured to convey a working fluid in a direction crosswise (e.g., substantially perpendicular) to the flow of steam. As the steam flows across the conduits, heat from the steam is transferred to the working fluid 126, thereby condensing the steam into water 128. The water 128 flows back to the HRSG 110 where it is heated by the exhaust gas 88 to produce more high pressure steam 116. The working fluid 126 is heated within the condenser 124 and exits as hot working fluid 130. The hot working fluid 130 is directed toward an evaporative chiller, such as the illustrated cooling tower 132, which cools the hot working fluid 130 to produce chilled working fluid 126 for the condenser 124. While the high pressure steam 116 is directed toward a steam turbine 118 in the present embodiment, it should be appreciated that alternative embodiments may utilize the high pressure steam 116 for an industrial process (e.g., gasification) before returning the low pressure steam 122 to the condenser 124.

In the illustrated embodiment, the desiccant system 134 is configured to reduce a humidity of the ambient airflow 30 into the cooling tower 132, thereby enabling the evaporative cooling process to absorb more heat from the working fluid. Consequently, the temperature of the chilled working fluid 126 may be reduced, thereby increasing the cooling capacity of the condenser 124. As a result, the combined cycle power generation system 108 may employ a smaller condenser 124, and/or fewer and/or smaller cooling towers, thereby reducing costs associated with manufacturing the system. As illustrated, the desiccant system 134 includes a desiccant flow assembly 54 and a regenerator 55. The desiccant flow assembly 54 is configured to flow a liquid desiccant 56 through the ambient airflow 30 to absorb moisture within the ambient airflow 30. Accordingly, the desiccant flow assembly 54 provides dehumidified air 58 to the cooling tower 132.

In the illustrated embodiment, the regenerator 55 is positioned to receive hot exhaust gas 112 from the HRSG 110. Accordingly, the exhaust gas 112 heats the liquid desiccant within the regenerator 55, thereby reducing the moisture content of the liquid desiccant. As illustrated, the regenerator 55 receives moisture-carrying liquid desiccant 72 from the desiccant flow assembly 54. Heating the liquid desiccant 72 within the regenerator 55 releases the moisture (e.g., in the form of water vapor), thereby establishing a flow of hot, dry liquid desiccant 74. The released moisture may be expelled into the atmosphere and/or condensed for use in other devices (e.g., within the combined cycle power generation system 108). The hot, dry liquid desiccant 74 flows through a cooling unit 76, such as a cooling tower, which reduces the temperature of the liquid desiccant. As a result, a cool, dry liquid desiccant 56 suitable for absorbing additional moisture is generated. The cool, dry liquid desiccant 56 flows back to the desiccant flow assembly 54 to reduce humidity within the ambient airflow into the cooling tower 132. Similar to the desiccant system 53 described above with reference to FIGS. 2-3, the desiccant system 134 includes a bypass valve 75 configured to selectively direct a portion of the moisture-carrying liquid desiccant 72 into the flow of hot, dry liquid desiccant 74, thereby bypassing the regenerator 55.

Because the regenerator 55 is positioned to receive the hot exhaust gas 112 from the HRSG 110, an additional heating unit (e.g., electric heater, liquid/gas fuel burner, etc.), which may be employed in certain embodiments to regenerate liquid desiccant, is obviated. As a result, the costs associated with manufacturing and operating the desiccant system may be reduced. While the illustrated regenerator 55 is configured to reduce the moisture content of the liquid desiccant using heat from the exhaust gas 112 of the HRSG 110, it should be appreciated that, in alternative embodiments, the regenerator may receive heat from other sources within the combined cycle power generation system 108. For example, in certain embodiments, the regenerator may receive heat from the exhaust flow 88, from the high pressure steam 116, from the low pressure steam 122, or from the hot working fluid 130. In further embodiments, the regenerator may receive heat from multiple sources (e.g., the turbine exhaust gas 88, and the HRSG exhaust gas 112).

Figure 7:
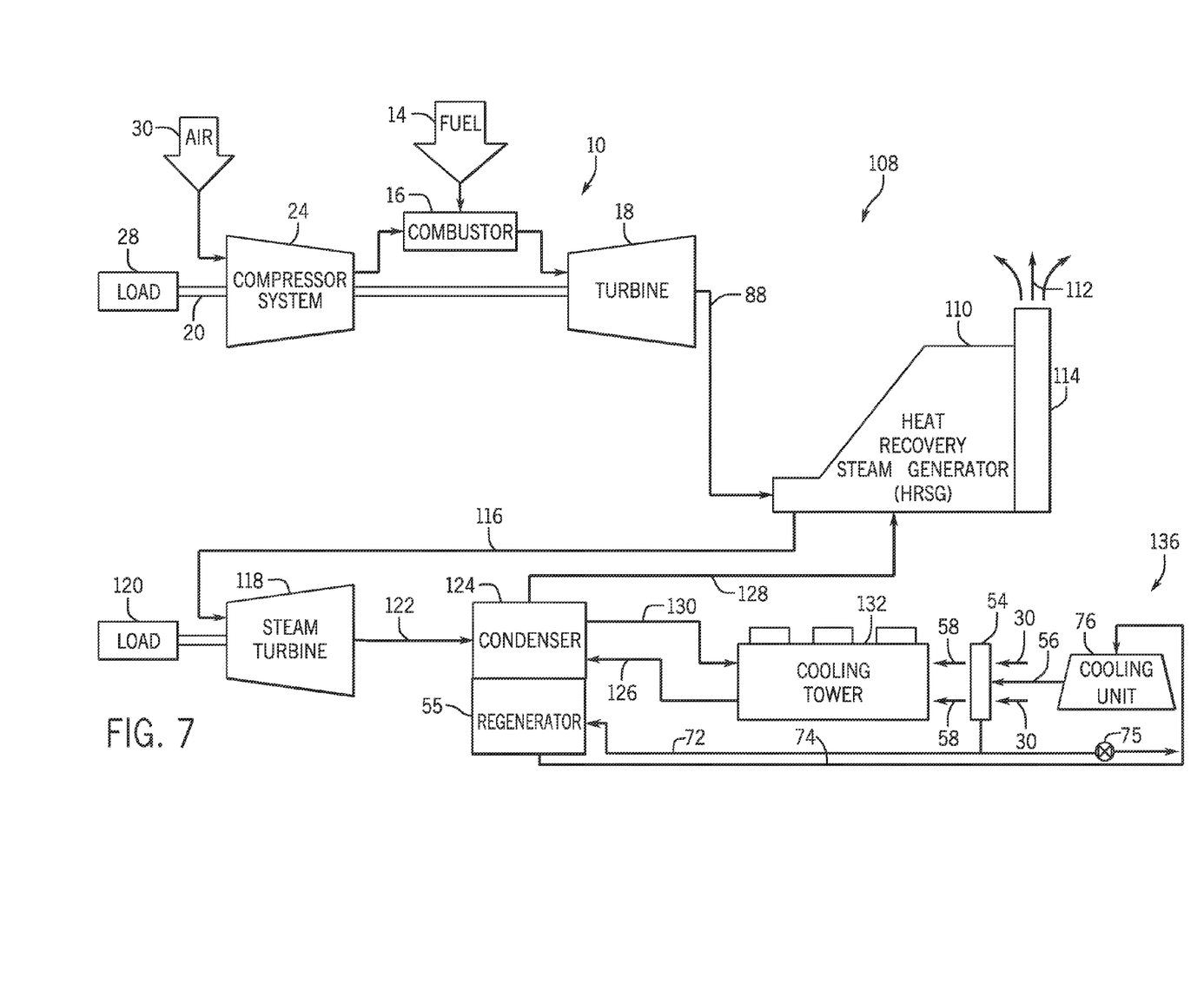
FIG. 7 is a block diagram of an exemplary combined cycle power generation system including an alternative embodiment of a desiccant system configured to reduce a humidity of ambient air within an evaporative chiller.

FIG. 7 is a block diagram of an exemplary combined cycle power generation system 108 including an alternative embodiment of a desiccant system 136 configured to reduce a humidity of ambient air within an evaporative chiller. In the illustrated embodiment, the regenerator 55 is configured to reduce the moisture content of the liquid desiccant using heat output from the condenser 124. For example, in certain embodiments, the regenerator 55 includes conduits configured to flow the liquid desiccant proximate to the working fluid conduits of the condenser 124. Accordingly, the low pressure steam 122 and/or the hot working fluid 130 within the condenser heats the liquid desiccant within the regenerator 55, thereby reducing the moisture content of the liquid desiccant.

As illustrated, the regenerator 55 receives moisture-carrying liquid desiccant 72 from the desiccant flow assembly 54. Heating the liquid desiccant 72 within the regenerator 55 releases the moisture (e.g., in the form of water vapor), thereby establishing a flow of hot, dry liquid desiccant 74. The released moisture may be expelled into the atmosphere and/or condensed for use in other devices (e.g., within the combined cycle power generation system 108). The hot, dry liquid desiccant 74 flows through a cooling unit 76, such as a cooling tower, which reduces the temperature of the liquid desiccant. As a result, a cool, dry liquid desiccant 56 suitable for absorbing additional moisture is generated. The cool, dry liquid desiccant 56 flows to the desiccant flow assembly 54 to reduce humidity within the ambient airflow into the cooling tower 132. Similar to the desiccant system 53 described above with reference to FIGS. 2-3, the desiccant system 136 includes a bypass valve 75 configured to selectively direct a portion of the moisture-carrying liquid desiccant 72 into the flow of hot, dry liquid desiccant 74, thereby bypassing the regenerator 55.

Because the regenerator 55 is positioned to receive heat output from the condenser 124, an additional heating unit (e.g., electric heater, liquid/gas fuel burner, etc.), which may be employed in certain embodiments to regenerate liquid desiccant, is obviated. As a result, the costs associated with manufacturing and operating the desiccant system may be reduced. In addition, because the regenerator absorbs heat from the condenser, the cooling capacity of the condenser may be enhanced. As a result, the combined cycle power generation system 108 may employ a smaller condenser 124, and/or fewer and/or smaller cooling towers, thereby reducing costs associated with manufacturing the system.

With regard to the combined cycle power generation system of FIGS. 6-7, it should be noted that the desiccant flow assembly 54 may be at least partially disposed about the periphery of the cooling tower 132. For example, the desiccant flow assembly 54 may extend about more than 25 percent, more than 50 percent, more than 75 percent, or approximately 100 percent of the periphery of the cooling tower 132. Furthermore, it should be appreciated that the cooling tower 132 may chill the working fluid via a closed loop system, such as the system described above with reference to FIG. 2, or an open loop system, such as the system described above with reference to FIG. 3. Moreover, it should be appreciated that the compressor system 24 may include an LP compressor, an intercooler, and an HP compressor. In such a configuration, working fluid from the intercooler may be chilled by an evaporative chiller having a desiccant system. The regenerator of such a desiccant system may be positioned to receive heat from the turbine exhaust gas 88, the HRSG exhaust gas 112, the high pressure steam 116, the low pressure steam 122, the condenser 124, and/or the hot working fluid 130 to facilitate moisture reduction of the desiccant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an intercooler configured to receive an airflow from a first compressor, to transfer heat from the airflow to a working fluid, and to provide the airflow to a second compressor;
a chiller configured to receive the working fluid from the intercooler, to chill the working fluid via cooling within an ambient air environment, and to provide the working fluid to the intercooler; and
a desiccant system configured to reduce a humidity of ambient air within the chiller, wherein the desiccant system comprises a desiccant flow assembly configured to flow a liquid desiccant through a flow of the ambient air into the chiller;
wherein the chiller is configured to receive the flow of the ambient air through a periphery of the chiller, the desiccant flow assembly is at least partially disposed about the periphery of the chiller, and the desiccant flow assembly extends about more than 50 percent of the periphery of the chiller.

2. The system of claim 1, wherein the desiccant system comprises a regenerator configured to receive at least a portion of the liquid desiccant from the desiccant flow assembly and to reduce a moisture content of the liquid desiccant within the regenerator.

3. The system of claim 2, wherein the regenerator is configured to reduce the moisture content of the liquid desiccant within the regenerator using the heat from the airflow from the first compressor.

4. The system of claim 2, wherein the regenerator is configured to reduce the moisture content of the liquid desiccant within the regenerator using heat from an exhaust flow from a turbine engine.

5. The system of claim 1, wherein the chiller is configured to chill the working fluid by flowing the working fluid through a heat exchanger and spraying a cooling fluid onto the heat exchanger.

6. The system of claim 1, wherein the chiller is configured to chill the working fluid by spraying the working fluid into the ambient air.

7. The system of claim 1, wherein the desiccant system comprises a controller configured to selectively activate the desiccant system based on at least one of a temperature of the ambient air and a humidity of the ambient air.

8. The system of claim 1, comprising a gas turbine engine having the intercooler.

9. The system of claim 1, wherein the desiccant flow assembly extends about more than 75 percent of the periphery of the chiller.

10. A system comprising:
a chiller configured to receive an ambient airflow through a periphery of the chiller and to chill a working fluid via cooling within the ambient airflow; and
a desiccant system at least partially disposed about the periphery of the chiller, wherein the desiccant system comprises a desiccant flow assembly configured to flow a liquid desiccant through the ambient airflow to reduce a humidity of the ambient airflow as the ambient airflow flows through the desiccant system into the chiller;
wherein the desiccant system comprises a regenerator configured to receive at least a portion of the liquid desiccant from the desiccant flow assembly and to heat the liquid desiccant within the regenerator to reduce a moisture content of the liquid desiccant within the regenerator, and the regenerator is configured to receive a second airflow output from the chiller to heat the liquid desiccant within the regenerator; and
wherein the regenerator is positioned above a top portion of the chiller.

11. The system of claim 10, comprising an intercooler configured to receive a second airflow from a compressor and to transfer heat from the second airflow to the working fluid.

12. The system of claim 10, wherein the desiccant flow assembly extends about more than 50 percent of the periphery of the chiller.

13. A system comprising:
an intercooler configured to receive a first airflow from a compressor and to transfer heat from the first airflow to a working fluid;
a chiller configured to receive the working fluid from the intercooler, to receive a second airflow from an ambient air environment, and to chill the working fluid via cooling within the second airflow; and
a desiccant system having a desiccant flow assembly and a regenerator, wherein the desiccant flow assembly is configured to flow a liquid desiccant through the second airflow to reduce a humidity of the second airflow;
wherein the regenerator is configured to receive at least a portion of the liquid desiccant from the desiccant flow assembly, to receive a third airflow output from the chiller, and to reduce a moisture content of the liquid desiccant within the regenerator using the heat from the third airflow.

14. The system of claim 13, wherein the regenerator is fluidly coupled to the compressor and configured to receive at least a portion of the first airflow to heat the liquid desiccant within the regenerator.

15. The system of claim 13, wherein the regenerator is fluidly coupled to the intercooler and configured to receive at least a portion of the working fluid to heat the liquid desiccant within the regenerator.

16. The system of claim 13, wherein the chiller is configured to receive the second airflow through a periphery of the chiller, and the desiccant flow assembly is at least partially disposed about the periphery of the chiller.

17. The system of claim 16, wherein the desiccant flow assembly extends about more than 50 percent of the periphery of the chiller.

18. The system of claim 13, wherein the regenerator is positioned above a top portion of the chiller.

* * * * *